United States Patent [19]

Johnson

[11] Patent Number: 4,473,928
[45] Date of Patent: Oct. 2, 1984

[54] HOSE CLAMPS

[75] Inventor: Francis W. Johnson, Burlington, Canada

[73] Assignee: Tridon Limited, Burlington, Canada

[21] Appl. No.: 323,504

[22] Filed: Nov. 23, 1981

Related U.S. Application Data

[63] Continuation-in-part of Ser. No. 208,752, Nov. 20, 1980.

[51] Int. Cl.³ .............................................. F16L 33/08
[52] U.S. Cl. .................................... 24/483; 29/469.5; 24/524
[58] Field of Search .......... 24/274 P, 274 R, 274 WB, 24/279, 269; 248/231, 205 A, 74 B, 467; 29/469.5

[56] References Cited

U.S. PATENT DOCUMENTS

| | | | |
|---|---|---|---|
| 3,173,450 | 3/1965 | Halterman | 24/279 |
| 3,233,922 | 2/1966 | Evans | 24/274 R X |
| 3,359,017 | 12/1967 | Schaub | 24/274 R X |
| 3,396,439 | 8/1968 | Schaub | 24/274 P |
| 3,424,482 | 1/1969 | Ligon | 24/274 R |
| 3,900,932 | 8/1975 | Allert | 24/274 R |
| 3,981,053 | 9/1976 | Kreuzer | 24/274 R |
| 4,059,872 | 11/1977 | Delesandri | 24/279 X |
| 4,197,620 | 4/1980 | Heuchert | 24/274 R |
| 4,310,137 | 1/1982 | Frye | 248/467 |

FOREIGN PATENT DOCUMENTS 212299 10/1957 Australia ........................ 24/274 P Primary Examiner—Victor N. Sakran
Assistant Examiner—Peter A. Aschenbrenner
Attorney, Agent, or Firm—Hirons, Rogers & Scott

[57] ABSTRACT

The invention provides an improvement in hose clamps of the type employing a worm screw mounted in a housing which is fastened to a metal band and engages in slots in the band. A thin backing layer is laminated to the metal band of the clamp on the face that engages the article to be clamped, for example, to prevent extrusion of hose materials through the slots. This backing layer is of a thickness such that it will be stretched by the screw thread lands, but is thick enough that it will not break or crack under such treatment. It is slightly narrower than the band material, so that it can be applied without protruding from edges and form a dangerous knife edge, and is fixed to the band by means of a resilient adhesive that will permit the required deformation without separation. The screw thread lands can now be made deep enough for positive engagement in the slots and even protrude slightly from the other side. This improved clamp can be manufactured by a continuous process of drawing a strip of metal from one coil, stamping runs of slots in it, drawing a backing strip from another coil, laminating the two strips together by means of a thin double sided adhesive tape that is interposed between them, cutting the resulting laminate into suitable band lengths, and then mounting the housing and screw thereon.

11 Claims, 3 Drawing Figures

HOSE CLAMPS

CROSS-REFERENCE TO RELATED APPLICATIONS

This application is a continuation-in-part of my application Ser. No. 208,752, filed 20th. Nov., 1980.

FIELD OF THE INVENTION

The invention is concerned with improvements in or relating to hose clamps for the type having a worm screw mounted in a housing fastened to a metal band, the worm screw engaging in a rack constituted by a plurality of slots in a slotted tang portion of the band.

BACKGROUND OF THE INVENTION

Hose clamps of the type specified are of course very well known, the clamp being tightened or loosened by rotation of the worm screw in the respective direction, such rotation moving the tang to increase or decrease its degree of overlap with the remainder of the metal band and hence the periphery of the clamp.

When the rack is provided by grooves that do not penetrate the band it is difficult to achieve the necessary high clamping pressures. Moreover, the grooves tend to wear easily with use and after a short time slipping can occur as the clamp is tightened.

Two major problems arise when the rack is provided by slots that penetrate completely through the band. Theoretically the depth of the worm screw lands could be made just equal to the thickness of the band, so as to have the maximum bearing surface without protrusion from the other side of the slot. In industrial practice this would require uneconomically precise tolerances, and there is a tendency therefore to provide for a deeper land, to ensure that the clamp can provide the necessary clamping pressure when tightened. Another problem is that some hose materials, especially silicone rubber materials, tend to extrude through the slots on tightening the clamp about the article being clamped. Such extrusion not only damages the hose but also tends to cause the clamp to stick and be difficult to loosen again when necessary.

At least two prior art clamps of the slotted type are being produced having shields between the band and the clamped article to prevent these problems. In one of these prior art clamps, slots are only provided over a predetermined distance to give a recommended range of diameters for the clamp, while the screw and its housing are set back from the other end of the band by a corresponding distance. Thus, an extended unslotted portion of the tang is interposed between the slotted portion and the clamped article when the clamp is in position; this arrangement is wasteful in material. Moreover, this extended unslotted tang portion must move under the remainder of the band while it is tight against the clamped article and tends to scrape the surface of the article. In addition, the range of adjustment is limited, since the extended unslotted tang portion will eventually complete a circle and butt against the housing.

A second prior art shielded clamp has an unslotted extra tang member welded to the inner surface of the band so as to pass behind the screw housing and the slots; this is subject to the same disadvantages as the first-described extended tang clamp.

SUMMARY OF THE INVENTION

We have discovered that it is possible to substantially overcome these disadvantages in an economical manner by providing a thin backing strip of special form that is fastened to the inner surface of the clamp band by means of an adhesive, the resulting laminated tang passing readily between the screw housing and the end of the band to which the screw housing is attached. Thus there is no moving part between the tightening periphery of the clamp band and the article, as with the first-described prior art clamp. Moreover, such a clamp makes it possible to use a simple continuous method of production.

In accordance with the invention there is provided a method of making a hose clamp of the type comprising a worm screw mounted in a housing fastened to a metal band, the worm screw having screw lands that are engagable in the slots of a slotted portion of the band, which slotted portion is passed through the housing between the worm screw and the portion of the band to which the housing is fastened, the method including the steps of:

stamping slots in a first metal strip to form said slotted portion of a respective metal hose band clamp;

laminating by means of a resilient adhesive to the face of the metal band that would otherwise contact the article to be clamped thereby, at least to cover the said slotted portion thereof which is passed through the housing, a backing strip of smaller width than the first metal strip thereby forming a laminated band, the thickness of the backing strip being such that it can be deformed by engagement of the screw lands therewith without breaking or cracking; and mounting the said housing and the said worm screw on the said laminate to complete the clamp.

Such a process is easily automated by continuously synchronously feeding the first metal strip, the backing strip and the adhesive from respective coils; passing them together through a laminating station where the first metal strip and the backing strip are connected together by means of the adhesive; which preferably is pressure sensitive, and passing the resultant laminate to a cutting station where it is cut into band lengths.

Also in accordance with the invention there is provided a hose clamp of the type comprising a worm screw mounted in a housing fastened to a metal band, the worm screw having screw lands that are engagable in the slots of a slotted portion of the band, which slotted portion passes through the housing of the band between the screw having screw land that are and the portion of the band, to which the housing is fastened, the band having laminated to the face thereof that in operation would otherwise contact the article to be clamped thereby, at least over the said slotted portion thereof which is passed through the housing, by means of a resilient adhesive, a backing strip of smaller width than said metal band, thereby forming a laminated band, the thickness of the backing strip being such that it can be deformed by engagement of the screw lands therewith without breaking or cracking.

Preferably, the said first metal strip is steel of thickness from about 0.5 mm to 0.75 mm and said backing strip is steel of thickness from about 0.075 mm to about 0.15 mm.

DESCRIPTION OF THE DRAWINGS

Particular preferred embodiments of the invention will now be described, by way of example, with reference to the accompanying drawings in which.

It will be understood that the dimensions of the clamp illustrated, particularly the thicknesses of parts thereof, must be exaggerated for clarity of illustration.

DESCRIPTION OF THE PREFERRED EMBODIMENTS

Figure 2:
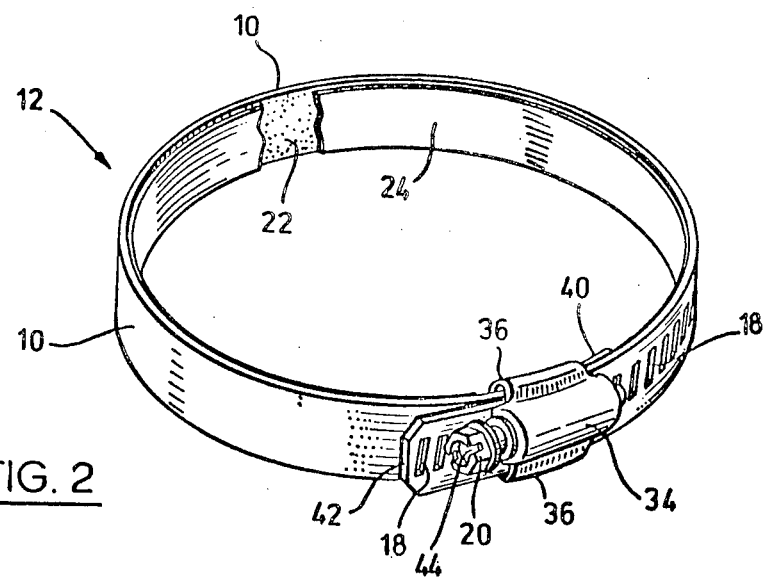
FIG. 2 is a perspective view of a hose clamp of the invention showing the top side of the screw housing.
Figure 3:
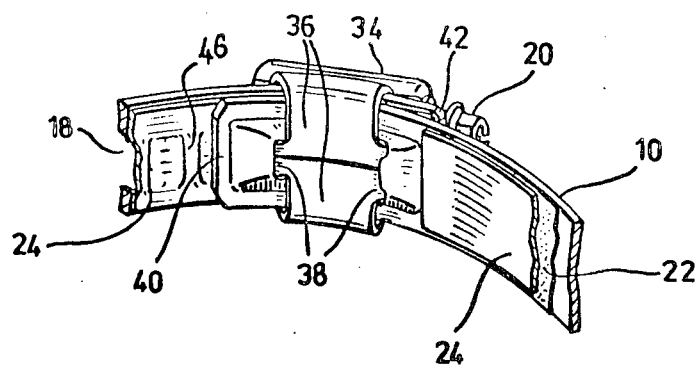
FIG. 3 is a perspective view to a larger scale of part of the clamp of FIG. 2 showing the under side of the screw housing and the adjacent portions of the band.

Referring now to FIGS. 2 and 3, a hose clip 12 of the invention consists of a suitable length 10 of metal strip provided at one end with elongated slots 18 disposed at an angle to the longitudinal axis of the strip 10, the choice of angle being such that the slots 18 form a rack for a worm screw 20 that is mounted for rotation about its longitudinal axis in a housing 34, the housing being fastened to one end of the strip in conventional manner by means of arm portions 36 that embrace the edges of the strip and longitudinal ears 38 that are engaged in respective transverse slots in the strip. The slots 18 may be provided over the whole length of strip 10, but more usually extend over a predetermined length at one end of the strip corresponding to the required range of diameters for the clamp. The screw 20 has the usual nut-shaped head provided with a straight screw driver slot 44.

A length of backing strip 24 is provided for each length 10 of metal strip, the backing strip 24 being of smaller width than the metal strip 10, so that it can be applied to the strip 10 by an automatic process of economic tolerances without danger of protruding from one or other side of the strip 10; the backing strip is much thinner than the strip 10 and such a protruding edge would form effectively a knife edge with consequent danger to the user and its surroundings. Each length of backing strip 24 is of considerably thinner material than its respective strip 10 and should be as thin as possible for economy of material and ease of passage through the housing. A criterion for the thickness of the backing strip 24 is that it will deform and stretch away from the band 10 around each individual land of worm screw 20, as illustrated at 46 in FIG. 3, but will not crack or break under this strain.

The backing strip 24 is attached to the metal strip 10 on the side thereof that would otherwise contact the article to which the clamp is applied by means of a layer 22 of an adhesive to form a laminated clamp band. The adhesive may be of any suitable pressure-sensitive type but conveniently is a modified acrylic transfer type of adhesive. The adhesive preferably is provided in the form of a double-sided tape which is interleaved in a continuous process between each backing strip 24 and respective metal strip 10.

The backing strip 24 need only extend over the slotted portion of the metal tang although in the embodiment illustrated, it extends over almost its entire length, except for the portion 42 occupied by the housing 34, so that a continuous surface abuts the clamped article without the presence of a transverse ridge caused by the strip end. It also protects the clamped article, which usually is of relatively soft elastomeric material, and prevents extrusion of the clamped material into the slots 18 and consequent wear by the projecting threads of the worm screw 20. Moreover in use, as it is engaged by the screw bands it can deform away from the slots 18 under the applied force for a more positive engagement of the worm screw 20 in the slots 18, thus avoiding the wear problems described above that arises from the use of grooves in attempting to avoid the protrusion problem. The inner surface of the clamp 12 provided by the band 24 is smooth with no moving part to scrape and wear the clamped article. A further advantage is the possibility of using a screw with somewhat deeper lands than has been possible hitherto, even with the prior art shielded clamps described; thus the thicker shields of these prior art clamps would not be drawn sufficiently readily for a deeper land to be used.

Figure 1:
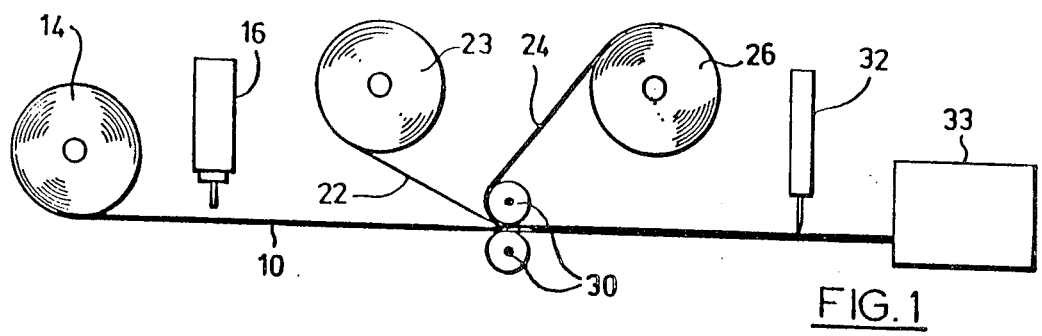
FIG. 1 is a schematic representation of a process of the invention for the manufacture of clamps of the invention.

A preferred continuous process of manufacturing clamps according to the invention is illustrated by FIG. 1. The metal strip 10 from which the hose clamp 12 is to be formed is fed from a coil 14 through a stamping station at which a punch 16 punches the elongated slots 18 in the strip 10 in runs located at intervals along the strip separated by unslotted portions. The length of each run of slots together with the length of an adjacent unslotted portion will be the total length of the band of the resulting clamp 12.

The slotted metal strip 10 emerges from the stamping station 16 and passes to a laminating station at which the layer 22 of adhesive is applied. In the preferred process the adhesive is applied in the form of a thin double-sided tape that is unreeled from a roll 23 thereof and is applied to the respective surface of the strip 10. Immediately thereafter the backing strip 24 is fed from a roll 26 thereof longitudinally aligned with the strip 10 and is pressed into contact with the layer of adhesive 22 between rollers 30 which apply sufficient pressure on the laminate of strips 10, 24 and adhesive layer 22 to ensure their subsequent adherence. It is important that the adhesive be of a type that remains resilient in use so that the portion of the shield strip engaged by the screw lands can be drawn and deformed by them in the manner described without separation of the remainder of the strip from the band tang. The laminate produced thereby travels to a cutting station where it is cut by a cutter 32 into bands of suitable length for the clamp.

The laminated bands are then provided at one end at a station 33 with the housing 34 and the worm screw 20; the apparatus and methods required at the station 33 for this latter step are not part of the present invention, and are well known to those skilled in the art, so that further description is not required. As described above, the preferred adhesive is a pressure-sensitive modifed acrylic transfer type, but other types of adhesive can of course be employed, provided they have the necessary physical characteristics.

Hose clamps of the type specified normally are produced in a range of sizes from about 9 mm to 19 mm width, and the material used for the strip 10 in the production of such clamps is normally of thickness about 0.5 mm to about 0.75 mm, the thickness usually of course increasing with the band width. The width of the backing strip 24 should for a normal commercial operation be at least 10% smaller in width than the strip 10 so that, for example, a band 10 of width 12.7 mm (0.5 in)

will have adhered thereto a strip 24 of width about 11.4 mm (0.45 in). The minimum width for the backing strip is of course set by the need to completely cover the slots 18 and also to provide the maximum possible margins alongside the slots for adherence of the backing strip to the band 10.

At the present time the only economical material for the production of hose clamps is steel, usually mild steel for normal uses, and stainless steel for special uses. Similarly, at the present time the only economical material for the backing strip 24 is steel, in view of the need to provide the thinnest possible material that will stretch in the manner described without breaking or cracking. Moreover, other materials of lower tensile strength than steel, e.g. aluminium and plastic materials, of the desired thickness may be formed to buckle as they are engaged by the leading edge 40 of the band resulting in a binding condition. This unwanted effect could be avoided by use of thicker material for the backing strip but with consequent added cost.

For the range of clamp sizes described above the thickness of the backing layer will be in the range about 0.075 mm to about 0.15 mm, while for the clamp mentioned above of 12.7 mm with the thickness preferably is 0.125 mm. It is found by application of the invention that the screw bands can be allowed to protrude through the slots 18 by as much as from 0.25 mm to 0.5 mm with the preferred amount about 0.375 mm, considerably increasing the security of the engagement of the screw in the slots.

We claim:

1. A method of making a hose clamp of the type comprising a worm screw mounted in a housing fastened to a metal band, the worm screw having screw lands that are engagable in the slots of a slotted portion of the band, which slotted portion is passed through the housing between the screw and the portion of the band to which the housing is fastened, the method including the steps of:

stamping slots in a first metal strip to form said slotted portion of the respective metal hose clamp band;

laminating by means of a resilient adhesive to the face of the metal band that would otherwise contact the article to be clamped thereby, at least to cover the said slotted portion thereof which is passed through the housing, a backing strip of smaller width than the first metal strip, thereby forming a laminated band, the thickness of the backing strip being such that it can be deformed by engagement of the screw lands therewith without breaking or cracking; and mounting the said housing and the said worm screw on the said laminated band to complete the clamp.

2. A method as claimed in claim 1, in which the said first metal strip is steel of thickness from about 0.5 mm to 0.75 mm and said backing strip is steel of thickness from about 0.075 mm to about 0.15 mm.

3. A method as claimed in claim 1 or 2, and in which said adhesive is applied between the first metal strip and the backing strip in the form of a double sided tape thereof to which the two strips adhere.

4. A method as claimed in claim 1 or 2, wherein said adhesive is a pressure sensitive adhesive.

5. A method as claimed in claim 1 or 2, wherein said adhesive is a pressure sensitive adhesive, and is applied between the first metal strip and the backing strip in the form of a double sided tape thereof to which the two strips adhere.

6. A hose clamp of the type comprising a worm screw mounted in a housing fastened to a metal band, the worm screw having screw lands that are engagable in the slots of a slotted portion of the band, which slotted portion passes through the housing between the screw and the portion of the band to which the housing is fastened, the band having laminated to the face thereof that in operation would otherwise contact the article to be clamped thereby, at least over the said slotted portion thereof which is passed through the housing, by means of a resilient adhesive, a backing strip of smaller width and thinner than said metal band, thereby forming a laminated band, the thickness of the backing strip being such that it can be deformed by engagement of the screw lands therewith without breaking or cracking.

7. A clamp as claimed in claim 6, in which the said first metal strip is steel of thickness from about 0.5 mm to 0.75 mm and said backing strip is steel of thickness from about 0.075 mm to about 0.15 mm.

8. A clamp as claimed in claim 6 or 7, in which the adhesive has the form of a double-sided tape thereof to which the metal band and the backing strip adhere.

9. A clamp as claimed in claim 6 or 7, wherein said adhesive is a pressure sensitive adhesive.

10. A clamp as claimed in claim 6 or 7, wherein the said adhesive is a pressure-sensitive adhesive and has the form of a double-sided tape thereof to which the metal band and the backing strip adhere.

11. A clamp as claimed in claim 6 or 7, wherein the screw-threaded bands protrude completely through the slots and extend from about 0.25 mm to about 0.5 mm beyond the slots.

* * * * *